(12) United States Patent
Shaffer et al.

(10) Patent No.: US 7,706,522 B2
(45) Date of Patent: Apr. 27, 2010

(54) METHOD AND SYSTEM FOR COMMUNICATING WITH AN AUTOMATIC CALL DISTRIBUTOR SYSTEM AGENT

(75) Inventors: Shmuel Shaffer, Palo Alto, CA (US); Labhesh Patel, Mountain View, CA (US); Joseph F. Khouri, San Jose, CA (US); Gebran G. Chahrouri, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1532 days.

(21) Appl. No.: 11/010,707

(22) Filed: Dec. 13, 2004

(65) Prior Publication Data

US 2006/0126816 A1 Jun. 15, 2006

(51) Int. Cl.
*H04M 5/06* (2006.01)
(52) U.S. Cl. .......... 379/265.11; 370/260; 370/270; 379/265.01; 379/266.01
(58) Field of Classification Search ......... 379/260–267, 379/70–84, 222–223, 226–228, 308–321, 379/67.1; 370/260–270
See application file for complete search history.

(56) References Cited

U.S. PATENT DOCUMENTS

| 5,185,780 | A | * | 2/1993 | Leggett ............... 379/265.08 |
| 5,544,232 | A | * | 8/1996 | Baker et al. ............ 379/88.25 |
| 5,857,018 | A | | 1/1999 | Sumner et al. ......... 379/265.13 |
| 5,867,559 | A | * | 2/1999 | Jorgensen et al. .......... 379/67.1 |
| 5,929,897 | A | | 7/1999 | Schneider et al. ........ 348/14.08 |
| 5,991,390 | A | * | 11/1999 | Booton ................ 379/265.02 |
| 5,999,965 | A | | 12/1999 | Kelly ..................... 709/202 |
| 6,049,779 | A | | 4/2000 | Berkson ..................... 705/14 |
| 6,266,407 | B1 | * | 7/2001 | Kneipp et al. .......... 379/265.02 |
| 6,408,066 | B1 | | 6/2002 | Andruska et al. ...... 379/265.12 |
| 6,501,839 | B1 | * | 12/2002 | Cutting et al. ......... 379/265.03 |
| 6,654,798 | B1 | | 11/2003 | Skibinski et al. ........... 709/220 |
| 6,744,877 | B1 | * | 6/2004 | Edwards ............... 379/265.02 |
| 6,748,072 | B1 | * | 6/2004 | McGraw et al. ........ 379/265.03 |
| 7,242,760 | B2 | * | 7/2007 | Shires .................. 379/265.01 |
| 7,372,957 | B2 | * | 5/2008 | Strathmeyer et al. ... 379/265.01 |
| 2001/0024497 | A1 | * | 9/2001 | Campbell et al. ...... 379/265.09 |
| 2003/0115353 | A1 | | 6/2003 | Deryugin et al. ............ 709/231 |
| 2005/0141692 | A1 | * | 6/2005 | Scherer et al. ......... 379/265.02 |
| 2007/0171886 | A1 | * | 7/2007 | Lewis et al. .................. 370/338 |

\* cited by examiner

*Primary Examiner*—Gerald Gauthier
(74) *Attorney, Agent, or Firm*—Baker Botts L.L.P.

(57) ABSTRACT

A method for communicating with an automatic call distributor system agent includes communicating through a communications link with a first agent of a plurality of agents associated with an automatic call distributor (ACD) system. The plurality of agents are able to receive user calls distributed by the ACD system. The user calls comprise requests for service. The method includes receiving an audible state command from the first agent through the communications link and changing the state of the first agent with respect to the ACD system in response to the audible state command.

43 Claims, 2 Drawing Sheets

METHOD AND SYSTEM FOR COMMUNICATING WITH AN AUTOMATIC CALL DISTRIBUTOR SYSTEM AGENT

TECHNICAL FIELD OF THE INVENTION

This invention relates in general to communication systems and, more particularly, to a method and system for communicating with an automatic call distributor system agent.

BACKGROUND OF THE INVENTION

Automatic call distributors (ACDS) are specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for information on what to do with a particular call; (iii) using this information, identify an appropriate agent and queue the call, often times providing a pre-recorded message; and (iv) connect the call to an agent as soon as the agent is available.

Agents in call centers utilizing ACD systems receive incoming customer calls routed to them by the ACD system, or they place call center related calls to customers. Agents may, at their desktop, change their state with their ACD system depending on their particular situation. Possible agent states may include "Ready," "Not Ready" and "At Work." An ACD system may make call routing decisions based on the various states of associated agents. For example, an ACD system may route calls to an agent in a Ready state and may avoid routing calls to any Not Ready agents until their state changes to a Ready state. Visually impaired agents may utilize special software, such as Job Access With Speech (JAWS) software, that analyzes changes in the desktop and conveys a status change to the agent either through prompts or a text-to-text speech (TTS) system.

SUMMARY OF THE INVENTION

The present invention provides a method and system for communicating with an automatic call distributor system agent that substantially eliminates or reduces at least some of the disadvantages and problems associated with previous methods and systems.

A method for communicating with an automatic call distributor system agent includes communicating through a communications link with a first agent of a plurality of agents associated with an automatic call distributor (ACD) system. The plurality of agents are able to receive user calls distributed by the ACD system. The user calls comprise requests for service. The method includes receiving an audible state command from the first agent through the communications link and changing the state of the first agent with respect to the ACD system in response to the audible state command.

The first agent may comprise a roaming agent, and the communications link may comprise a wireless communications link between a mobile endpoint of the roaming agent and the ACD system. The first agent may also comprise a visually-impaired agent. The method may also include receiving a log-in call from the first agent to establish the communications link and audibly authenticating the first agent through the communications link. The audible state command may comprise a request for transfer from a Not Ready state to a Ready state, and changing the state of the first agent with respect to the ACD system in response to the audible state command may comprise changing the state of the first agent from the Not Ready state to the Ready state. The audible state command may also comprise speech of the first agent or dual tone multiple frequency signals.

In accordance with another embodiment, a method for communicating with an automatic call distributor system agent includes receiving at an automatic call distributor (ACD) system a user call from a user. The user call comprises a request for service. The method includes distributing the user call to a first agent in a Ready state of a plurality of agents associated with the ACD system and withdrawing the user call from the first agent if the first agent does not answer the user call. After withdrawing the user call from the first agent, the method includes automatically changing the state of the first agent to a Not Ready state and initiating an alert call to the first agent to alert the first agent that the state of the first agent has been automatically changed to the Not Ready state. The method also includes receiving an audible state change command from the first agent in response to the alert call and changing the state of the first agent with respect to the ACD system to the Ready state in response to the audible state change command.

In accordance with yet another embodiment, a method for communicating with an automatic call distributor system agent includes receiving at an automatic call distributor (ACD) system a user call from a user. The user call comprises a request for service. The method includes distributing the user call to a first agent of a plurality of agents associated with the ACD system and communicating first agent state status information to the first agent through whisper communications while the first agent is on the user call with the user. The method also includes receiving a state change command from the first agent through dual tone multiple frequency (DTMF) signals while the first agent is on the user call with the user and changing the state of the first agent with respect to the ACD system in response to the state change command.

Technical advantages of particular embodiments of the present invention include methods and systems that enable such roaming or visually-impaired agents to communicate with an ACD system using audible commands through, for example, speech or DTMF signals. Such communication gives roaming and visually-impaired agents the ability to change their state with the ACD and perform other ACD-related tasks without the need for special software (such as screen reading software) attached to the agent desktop, as the provided functionality may be integrated within the ACD system. In addition to being compliant with accessibility requirements associated with visually-impaired persons, particular embodiments enhance the ability of an agent to handle calls while physically away from the agent's ACD desktop. In addition, no special phone is needed, as a conventional mobile phone may be used since audible communication between the ACD system and the agent may be made through speech or DTMF signals.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
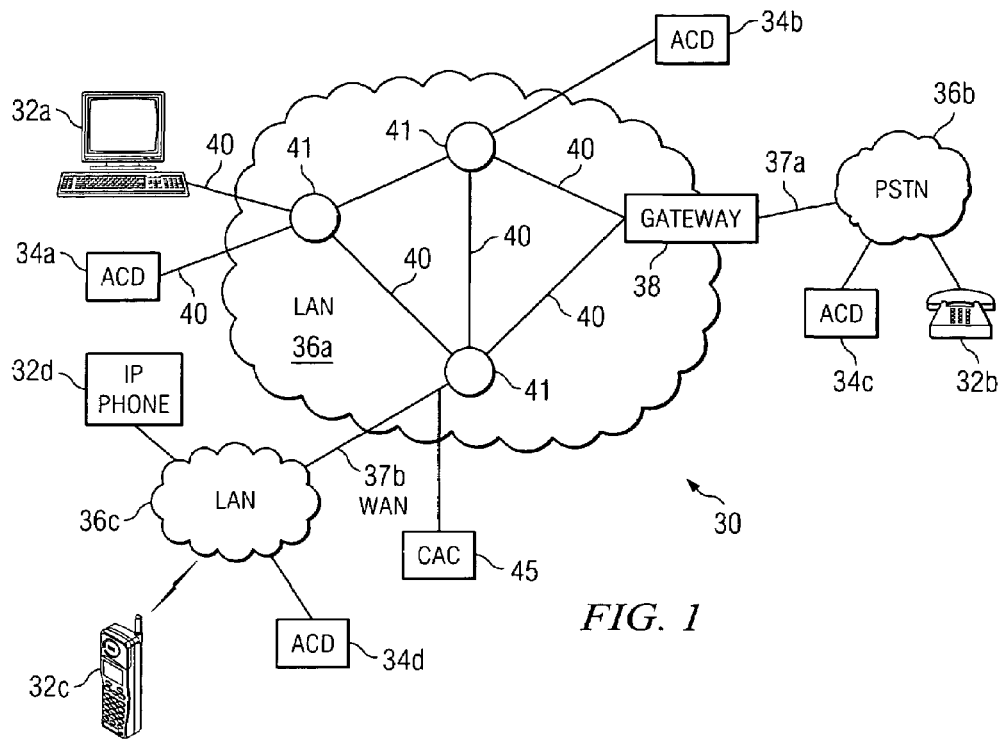
FIG. 1 illustrates a communication system including a plurality of endpoints operable to communicate among each other and a plurality of automatic call distributor systems, in accordance with a particular embodiment of the present invention.

FIG. 1 illustrates a communication system 30 including a plurality of endpoints 32a-32d having the ability to establish communication sessions between each other and/or automatic call distributors (ACD) systems 34a-34d, using one or more of communication networks 36a-36c. ACDs are specialized communication systems designed to route incoming calls to available agents, so that calls are properly and/or evenly distributed. For the purposes of this specification, "automatic call distributor," "automatic call distributor system, "ACD," or "ACD system" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, instant messaging and e-mail. ACDs may include call centers that receive incoming customer calls for distribution to agents and that place calls from agents to customers.

In the illustrated embodiment, incoming calls are routed to an ACD of a communication system. The calls are distributed to agents able to service the ACD. However, at times an agent receiving the calls may be communicating on a mobile endpoint, such as a mobile phone, and may not be present at his desktop. In addition, some visually-impaired agents may not be able to see their desktop. The teachings of the present invention provide methods and systems that enable such agents to communicate with the ACD using audible commands through, for example, speech or dual tone multiple frequency (DTMF) signals. Such communication gives roaming and visually-impaired agents the ability to change their state with the ACD and perform other ACD-related tasks without the need for special software (such as screen reading software) attached to the agent desktop, as the provided functionality may be integrated within the ACD system. Agents may check and alter their state from any endpoint, such as any phone.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and ACDs 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor the amount of bandwidth available over WAN 37b.

Communication network 36a includes a plurality of segments 40 and nodes 41 that couple endpoint 32a with ACDs 34a and 34b, gateway 38, and communication networks 36b-36c. Therefore, a user of endpoint 32a is provided with access to endpoints 32b-32d, and ACDs 34a-34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunications networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (Vop). In the illustrated embodiment, endpoint 32d, ACDs 34a-34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other device capable of performing telephony functions over an IP network.

It will be recognized by those of ordinary skill in the art that endpoints 32a-32d, ACDs 34a-34d, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
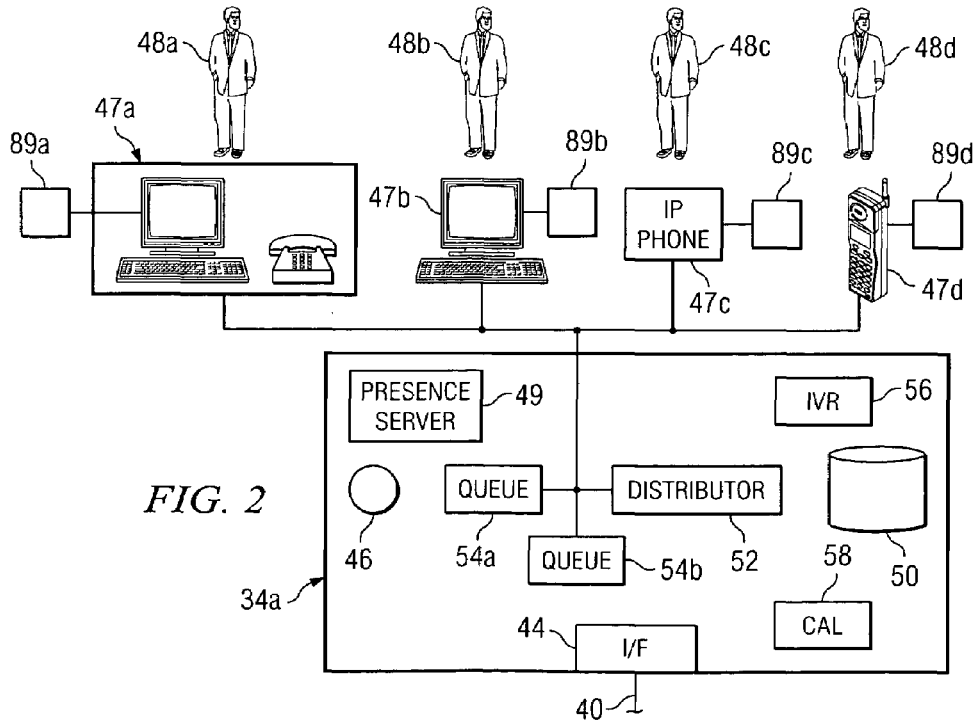
FIG. 2 illustrates an automatic call distributor system of FIG. 1 in more detail, illustrating aspects of the present invention.

FIG. 2 illustrates automatic call distributor 34a in more detail, in accordance with a particular embodiment of the present invention. ACD 34a includes an interface or input ports 44 which couple ACD 34a with communication network 36a, using segment 40. When a call is received at ACD 34a, a processor 46 and presence server 49 are used to determine which of a plurality of agents 48a-48d should receive the call using endpoints 47a-47d, respectively. In doing so, processor 46 may use presence server 49, a memory lookup, a database, or other memory module, such as memory module 50. Agents 48a-48d may interact with ACD 34a through their endpoints, such as desktops, IP phones, mobile phones or other devices. Such interaction may include changing their "state" with ACD 34a. ACD 34a includes, for example, an interactive voice response (IVR) system 56 through which agents may interact. IVR system 56 may utilize speech recognition technology so that agents may use various features of ACD 34a using their voices. IVR system 56 may play prompts to which agents may audibly respond, through for example speech or DTMF signals, to manage agent states with ACD 34a, as discussed below. IVR system 56 may comprise any combination of hardware, software and/or encoded logic. In addition, ACD 34a includes a calendar 58 that contains agent schedule information for use in workforce planning.

Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

Presence server 49 may be any combination of hardware, software and/or encoded logic, and is used to monitor the presence of an agent at an endpoint. Presence server 49 may detect the presence of an agent at an endpoint in association with one or more of presence clients 89a-89d at the agent's endpoint, for example, at the agent's PC, phone, personal digital assistant (PDA) or any other presence client device (e.g., presence clients 89a-89d). The ACD uses processor 46 to monitor conditions of ACD 34a, such as the number, type or characteristics of calls in queues 54 or the "state" of each agent. Agents may be placed in various states, according to their current status with respect to the ACD. In particular embodiments, agent states may include a "Ready" state, a "Not Ready" state, a "Menu" state and a "Talking" state. Various other agent states may be utilized in other embodiments. The state of an agent may dictate various actions of the ACD with respect to the agent, such as whether the agent is distributed incoming calls from users or customers. For example, an agent in a Ready state may be ready and able to accept an incoming call distributed by the ACD. Similarly, an agent in a Not Ready state may be unable or otherwise not ready to accept an incoming call, and an agent in a talking state may currently be communicating on an incoming or outgoing call.

It will be recognized by those of ordinary skill in the art that ACD 34a may include any number of processors or memory or other modules to accomplish the functionality and features described herein. The processors 46, memory modules 50, presence server 49 and/or IVR system 56 associated with ACD 34a may be centrally located (local) with respect to one another, or distributed throughout communication network 36a. In particular embodiments, ACD and IVR software may execute in the same Java environment or engine.

If a suitable agent is available to receive the incoming call, a distributor 52 of ACD 34a distributes the call to such agent for handling. Such handling may comprise, for example, connecting a caller of the call with the suitable agent if the call comprises a voice call or forwarding the call to the suitable agent if the call comprises, for example, an e-mail. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or ACD 34a. While a customer is waiting for an agent, ACD 34a may perform one or more of several functions including data collection from the user, playing of pre-recorded messages, or other automated process. As soon as a suitable agent becomes available, distributor 52 distributes the call to the appropriate agent.

In some circumstances, an agent, such as agent 48d, may desire to move away from their desktop. For example, an agent at a hardware store that utilizes an ACD to distribute calls may need to walk around the store to service customers. These agents who need to move physically away from their desktop (i.e., "roaming" agents) may not be able to see their state on their desktop and thus may not be able to use the desktop to alter their state. In some cases, a mobile phone endpoint of a roaming agent may lose its wireless connection with an ACD, for example if the agent is in an elevator, a "dead" area or otherwise out of wireless connectivity range. Upon such loss of wireless connection with the agent's endpoint, the ACD may automatically transfer the state of the agent to a Not Ready state without the agent's knowledge. Particular embodiments provide the ability, for example through mobile phone endpoints such as endpoint 47d of agent 48d, for roaming or visually-impaired agents unable to view their desktops to monitor and change their state and to utilize other functionality available to agents who are able to be physically present at or who are able to view their desktops. This ability may be provided through audible communication between the agent and the ACD, such as through speech of the agent or DTMF signals. A "visually-impaired" agent may be an agent who is unable to read or see their agent desktop to effectively use the functions of the ACD. In addition, a roaming agent whose mobile phone endpoint encounters a dead area resulting in an agent state change to a Not Ready state can check on his state to learn of such change. In some embodiments, the ACD may call the agent to notify the agent of the change in state, as further discussed below.

In particular embodiments, IVR system 56 may be used to login and authenticate a roaming or visually-impaired agent. To authenticate himself, the agent may dial an "agent authentication" number with ACD 34a. In response, ACD 34a may play the following prompt: "Please enter your extension number." When the agent keys in his ACD identification or extension, ACD 34a may prompt the agent to enter his password. IVR system 56 may use a directory step to authenticate the agent. ACD 34a may either prompt the agent to use DTMF signals or utilize speech recognition capabilities and prompt the agent to respond verbally to the inquiries. Upon proper authentication, the agent may be logged into ACD 34a.

When a roaming or visually-impaired agent using a mobile phone endpoint is logged into ACD 34a, the agent may desire to change his state with the system. As indicated above, the agent may be roaming away from his desktop or may be visually impaired such that he cannot view his desktop to effectively utilize the ACD functions. Particular embodiments enable such an agent to change his state with ACD 34a through, for example, IVR system 56. A roaming agent who desires to change his state may call ACD 34a using a mobile phone endpoint, such as endpoint 47d. IVR system 56 of ACD 34a may play a prompt such as, "You are in the Not Ready state. If you wish to move to the Ready state please press 1 or say 'ready.'" When the agent presses "1" or says "ready," ACD 34a acknowledges his new state by playing the prompt "You are now in the Ready state."

In some embodiments, an agent may have access to the ACD menu at all times even while currently on a call. This may be accomplished through a "whisper" feature whereby ACD 34a may play relevant prompts to the agent even while the agent is on a call with a customer. Whisper communication may comprise audible communication to the agent that a caller on the other end of a call who is currently talking to the agent cannot hear. In this instance, the agent may only be able to use DTMF signals to communicate with ACD 34a, as speech recognition may not be used effectively if the agent is on a call.

In particular embodiments, a new "Menu" state may be established and defined for when agents are audibly navigating through the ACD menu via IVR system 56 and speech recognition or otherwise. Agents may navigate through an ACD menu to, for example, change their state with the ACD, change operational settings of the ACD with respect to the agent or perform other administrative tasks with respect to the ACD. When an agent is in the Menu state, he may be made unavailable for answering calls and his voice path may be connected to speech recognition software of the ACD that is associated with the ACD menu functionality. In accordance with this embodiment, when the agent is in the Menu state the ACD system may periodically play a prompt to the agent "You are in the Menu state and cannot receive calls. To exit the Menu state, please press 1 or say Exit." In some embodiments, the agent may enter the Menu state by calling into an ACD menu number or by pressing a pre-designated DTMF key while on a call. The agent may be reminded of the option of transitioning to the Menu state via a periodic whisper instruction, such as "Please press the * key to move to the Menu state." If the agent presses the * key while on a call, his state may then change to a transition state, such as a "Talking, pending Menu" state. When the call ends, the agent is then transitioned to the Menu state wherein he can communicate with menu software of ACD 34a either through, for example, DTMF signals or speech recognition.

If ACD 34a attempts to distribute a call to an agent that does not answer, the call may be withdrawn from the agent and transferred back to the head of a queue 54. In addition, to prevent additional calls from being transferred to the unanswering agent, the agent's state may be changed to "Not Ready." In particular embodiments, when such a state change occurs, ACD 34a may alert the agent that his state was transitioned to Not Ready. In one embodiment, such an alert may be made through a connection with the agent's endpoint (e.g., a mobile phone endpoint) using IVR system 56. The IVR system may play the following prompt: "Your state was forced to Not Ready. To go back to the Ready state, please press 1 or say 'ready.' If you want to stay in the Not Ready state please press 2 or say 'not ready.'" Once the ACD obtains the agent's input, it may stop alerting the agent regarding the system initiated state transition. In some embodiments, ACD 34a may call the agent at his endpoint and play the prompts described above until the agent indicates to the ACD the state to which he would like to be transitioned. ACD 34a may also alert an agent of a change to a Not Ready state that results from the agent's mobile phone endpoint losing wireless connection, for example by entering a dead area or leaving connectivity range as discussed above. The ACD may wait until a wireless connection with the agent's mobile phone endpoint is reestablished before attempting to alert the agent of the change to the Not Ready state.

In some embodiments, ACD 34a may access workforce planning calendar 58 to determine whether to notify an agent of a state change. For example, if an agent is not scheduled to be at work (e.g., if it is after the agent's scheduled time off of work for the day or if the agent is scheduled to be at a meeting out of the office) according to calendar 58, then ACD 34a may not alert the agent that the agent's state has been changed. However, if according to calendar 58 the agent is scheduled to be at work when, for example, his mobile phone endpoint loses wireless connectivity resulting in an automatic state change to the Not Ready state, then the ACD may alert the agent of such state change as described above. The ACD may then await an audible state change command from the agent for transition back to the Ready state.

Figure 3:
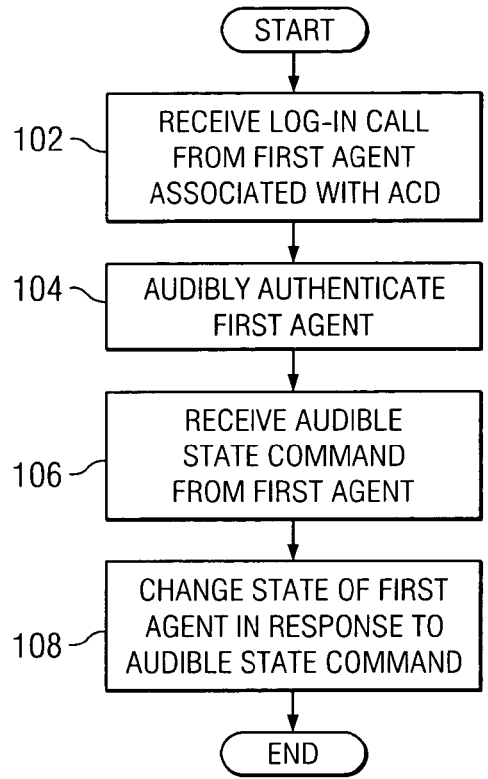
FIG. 3 is a flowchart illustrating a method for communicating with an automatic call distributor agent using a log-in call, in accordance with a particular embodiment.

FIG. 3 is a flowchart illustrating a method for communicating with an automatic call distributor agent using a log-in call, in accordance with a particular embodiment. The method begins at step 102 where a log-in call is received from a first agent of a plurality of agents associated with an ACD system. The first agent may comprise a roaming agent communicating with the ACD using a mobile phone endpoint. At step 104, the ACD system audibly authenticates the first agent using, for example, speech recognition or DTMF signals. At step 106, the ACD system receives an audible state command from the first agent. The audible state command may comprise a request from the first agent to change the state of the first agent with respect to the ACD system from a Not Ready state to a Ready state. The audible state command may comprise speech or DTMF signals. At step 108, the ACD system changes the state of the first agent in response to the audible state command received.

Figure 4:
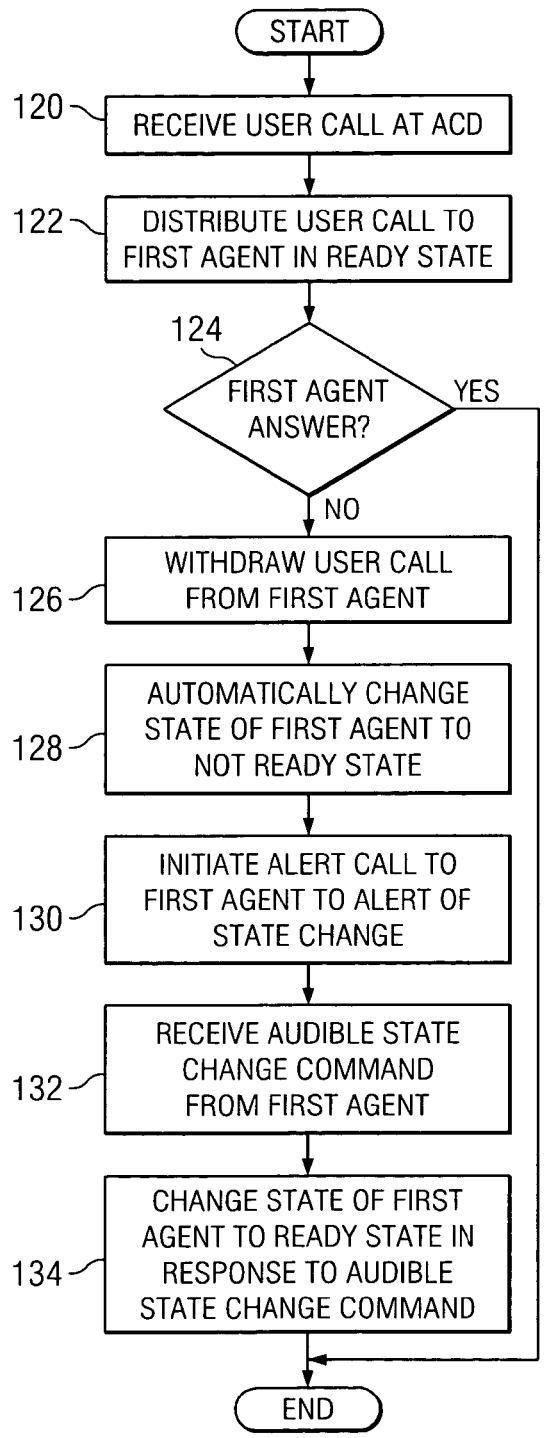
FIG. 4 is a flowchart illustrating a method for communicating with an automatic call distributor agent implementing a system-initiated alert, in accordance with a particular embodiment.

FIG. 4 is a flowchart illustrating a method for communicating with an automatic call distributor agent implementing a system-initiated alert, in accordance with a particular embodiment. The method begins at step 120 where a user call is received at an ACD system. The user call may comprise a customer request for service from an agent associated with the ACD system. At step 122, the user call is distributed to a first agent in a Ready state.

At step 124, it is determined whether the first agent answers the user call. Even though the first agent is in the Ready state, he may have left his desktop and/or endpoint without changing his state to Not Ready or may be otherwise unable to answer despite being in the Ready state. If the first agent answers the user call, the method ends. If the first agent does not answer the user call, the method proceeds to step 126 where the user call is withdrawn from the first agent. At step 128, the state of the first agent is automatically changed to the Not Ready state since the first agent did not answer the user call.

At step 130, an alert call is initiated to the first agent to alert the first agent of the state change. The first agent may answer the alert call on a mobile phone endpoint if, for example, the first agent is away from his desktop. At step 132, the ACD system receives an audible state change command from the first agent. The audible state change command may comprise a request from the first agent to change the state of the first agent with respect to the ACD system from the Not Ready state to the Ready state. The audible state command may comprise speech or DTMF signals, for example, received through a mobile phone endpoint of the first agent while he is roaming away from his desktop. At step 134, the ACD system changes the state of the first agent in response to the audible state change command received.

Some of the steps illustrated in FIGS. 3 and 4 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic call distributor 34a, these elements may be combined, rearranged or positioned in order to accommodate particular routing architectures or needs. In addition, any of these elements may be provided as separate external components to communication system 30, automatic call distributor 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for communicating with an automatic call distributor system agent, comprising:
   communicating through a communications link with a first agent of a plurality of agents associated with an automatic call distributor (ACD) system, the plurality of agents able to receive user calls distributed by the ACD system, the user calls comprising requests for service;
   receiving an audible state command from the first agent through the communications link; and
   changing the state of the first agent with respect to the ACD system in response to the audible state command.

2. The method of claim 1, wherein:
   the first agent comprises a roaming agent; and
   the communications link comprises a wireless communications link between a mobile endpoint of the roaming agent and the ACD system.

3. The method of claim 1, wherein the first agent comprises a visually-impaired agent.

4. The method of claim 1, further comprising:
   receiving a log-in call from the first agent to establish the communications link;
   audibly authenticating the first agent through the communications link;
   wherein the audible state command comprises a request for transfer from a Not Ready state to a Ready state; and
   wherein changing the state of the first agent with respect to the ACD system in response to the audible state command comprises changing the state of the first agent from the Not Ready state to the Ready state.

5. The method of claim 1:
   wherein the audible state command comprises an audible command to transfer the first agent to a Menu state for navigating through an agent menu of the ACD system; and
   further comprising receiving audible navigation commands from the first agent to navigate through the agent menu.

6. The method of claim 5, further comprising periodically communicating a whisper reminder message to the first agent while the first agent is on a user call to remind the first agent that the first agent may communicate a predefined audible command to transfer the first agent to the Menu state.

7. The method of claim 1, wherein the audible state command comprises speech of the first agent.

8. The method of claim 1, wherein the audible state command comprises dual tone multiple frequency signals.

9. The method of claim 1, wherein the audible state command comprises a command requesting a change in the state of the first agent from a Ready state to a Not Ready state or a command requesting a change in the state of the first agent from a Not Ready state to a Ready state.

10. A method for communicating with an automatic call distributor system agent, comprising:
    receiving at an automatic call distributor (ACD) system a user call from a user, the user call comprising a request for service;
    distributing the user call to a first agent in a Ready state of a plurality of agents associated with the ACD system;
    withdrawing the user call from the first agent if the first agent does not answer the user call;
    after withdrawing the user call from the first agent, automatically changing the state of the first agent to a Not Ready state;
    initiating an alert call to the first agent to alert the first agent that the state of the first agent has been automatically changed to the Not Ready state;
    receiving an audible state change command from the first agent in response to the alert call; and
    changing the state of the first agent with respect to the ACD system to the Ready state in response to the audible state change command.

11. The method of claim 10, wherein:
    the agent comprises a roaming agent; and
    initiating an alert call to the first agent comprises initiating an alert call to a mobile endpoint of the roaming agent.

12. The method of claim 10, wherein the audible state change command comprises speech of the first agent.

13. The method of claim 10, wherein the audible state command comprises dual tone multiple frequency signals.

14. A method for communicating with an automatic call distributor system agent, comprising:
- receiving at an automatic call distributor (ACD) system a user call from a user, the user call comprising a request for service;
- distributing the user call to a first agent of a plurality of agents associated with the ACD system;
- communicating first agent state status information to the first agent through whisper communications while the first agent is on the user call with the user;
- receiving a state change command from the first agent through dual tone multiple frequency (DTMF) signals while the first agent is on the user call with the user; and
- changing the state of the first agent with respect to the ACD system in response to the state change command.

15. An automatic call distributor (ACD) system, comprising:
- a processor operable to communicate through a communications link with a first agent of a plurality of agents associated with the ACD system, the plurality of agents able to receive user calls distributed by the ACD system, the user calls comprising requests for service;
- an interactive voice response (IVR) system coupled to the processor and operable to receive an audible state command from the first agent through the communications link; and
- the processor operable to changing the state of the first agent with respect to the ACD system in response to the audible state command.

16. The system of claim 15, wherein:
- the first agent comprises a roaming agent; and
- the communications link comprises a wireless communications link between a mobile endpoint of the roaming agent and the ACD system.

17. The system of claim 15, wherein the first agent comprises a visually-impaired agent.

18. The system of claim 15, wherein:
- the processor is operable to:
  - receive a log-in call from the first agent to establish the communications link; and
  - audibly authenticate the first agent through the communications link;
- the audible state command comprises a request for transfer from a Not Ready state to a Ready state; and
- the processor operable to change the state of the first agent with respect to the ACD system in response to the audible state command comprises the processor operable to change the state of the first agent from the Not Ready state to the Ready state.

19. The system of claim 15, wherein:
- the audible state command comprises an audible command to transfer the first agent to a Menu state for navigating through an agent menu of the ACD system; and
- the IVR system is operable to receive audible navigation commands from the first agent to navigate through the agent menu.

20. The system of claim 19, wherein the processor is operable to periodically communicating a whisper reminder message to the first agent while the first agent is on a user call to remind the first agent that the first agent may communicate a predefined audible command to transfer the first agent to the Menu state.

21. The system of claim 15, wherein the audible state command comprises speech of the first agent.

22. The system of claim 15, wherein the audible state command comprises dual tone multiple frequency signals.

23. The system of claim 15, wherein the audible state command comprises a command requesting a change in the state of the first agent from a Ready state to a Not Ready state or a command requesting a change in the state of the first agent from a Not Ready state to a Ready state.

24. A system for communicating with an automatic call distributor system agent, comprising:
- means for communicating through a communications link with a first agent of a plurality of agents associated with an automatic call distributor (ACD) system, the plurality of agents able to receive user calls distributed by the ACD system, the user calls comprising requests for service;
- means for receiving an audible state command from the first agent through the communications link; and
- means for changing the state of the first agent with respect to the ACD system in response to the audible state command.

25. The system of claim 24, wherein:
- the first agent comprises a roaming agent; and
- the communications link comprises a wireless communications link between a mobile endpoint of the roaming agent and the ACD system.

26. The system of claim 24, wherein the first agent comprises a visually-impaired agent.

27. The system of claim 24, further comprising:
- means for receiving a log-in call from the first agent to establish the communications link;
- means for audibly authenticating the first agent through the communications link;
- wherein the audible state command comprises a request for transfer from a Not Ready state to a Ready state; and
- wherein means for changing the state of the first agent with respect to the ACD system in response to the audible state command comprises means for changing the state of the first agent from the Not Ready state to the Ready state.

28. The system of claim 24:
- wherein the audible state command comprises an audible command to transfer the first agent to a Menu state for navigating through an agent menu of the ACD system; and
- further comprising means for receiving audible navigation commands from the first agent to navigate through the agent menu.

29. The system of claim 28, further comprising means for periodically communicating a whisper reminder message to the first agent while the first agent is on a user call to remind the first agent that the first agent may communicate a predefined audible command to transfer the first agent to the Menu state.

30. The system of claim 24, wherein the audible state command comprises speech of the first agent.

31. The system of claim 24, wherein the audible state command comprises dual tone multiple frequency signals.

32. The system of claim 24, wherein the audible state command comprises a command requesting a change in the state of the first agent from a Ready state to a Not Ready state or a command requesting a change in the state of the first agent from a Not Ready state to a Ready state.

33. Software embodied in a computer readable medium, the computer readable medium comprising code operable to:

communicate through a communications link with a first agent of a plurality of agents associated with an automatic call distributor (ACD) system, the plurality of agents able to receive user calls distributed by the ACD system, the user calls comprising requests for service;

receive an audible state command from the first agent through the communications link; and change the state of the first agent with respect to the ACD system in response to the audible state command.

34. The medium of claim 33, wherein:

the first agent comprises a roaming agent; and the communications link comprises a wireless communications link between a mobile endpoint of the roaming agent and the ACD system.

35. The medium of claim 33, wherein the first agent comprises a visually-impaired agent.

36. The medium of claim 33, further comprising code operable to:

receive a log-in call from the first agent to establish the communications link;

audibly authenticate the first agent through the communications link;

wherein the audible state command comprises a request for transfer from a Not Ready state to a Ready state; and wherein code operable to change the state of the first agent with respect to the ACD system in response to the audible state command comprises code operable to change the state of the first agent from the Not Ready state to the Ready state.

37. The medium of claim 33:

wherein the audible state command comprises an audible command to transfer the first agent to a Menu state for navigating through an agent menu of the ACD system; and further comprising code operable to receive audible navigation commands from the first agent to navigate through the agent menu.

38. The medium of claim 37, further comprising code operable to periodically communicate a whisper reminder message to the first agent while the first agent is on a user call to remind the first agent that the first agent may communicate a predefined audible command to transfer the first agent to the Menu state.

39. The medium of claim 33, wherein the audible state command comprises speech of the first agent.

40. The medium of claim 33, wherein the audible state command comprises dual tone multiple frequency signals.

41. The medium of claim 33, wherein the audible state command comprises a command requesting a change in the state of the first agent from a Ready state to a Not Ready state or a command requesting a change in the state of the first agent from a Not Ready state to a Ready state.

42. A method for communicating with an automatic call distributor system agent, comprising:

maintaining a wireless communications link with a mobile endpoint of a roaming agent of a plurality of agents associated with an automatic call distributor (ACD) system, the plurality of agents able to receive user calls distributed by the ACD system, the user calls comprising requests for service;

losing the wireless communications link with the mobile endpoint of the roaming agent;

automatically changing the state of the roaming agent to a Not Ready state in response to the losing the wireless communication;

initiating an alert call to the roaming agent to alert the roaming agent that the state of the roaming agent has been automatically changed to the Not Ready state;

receiving an audible state change command from the roaming agent in response to the alert call; and changing the state of the roaming agent with respect to the ACD system to the Ready state in response to the audible state change command.

43. The method of claim 42, further comprising accessing a calendar to determine whether the roaming agent is scheduled to be at work before initiating an alert call to the roaming agent to alert the roaming agent that the state of the roaming agent has been automatically changed to the Not Ready state.

* * * * *